(12) United States Patent
Matthys

(10) Patent No.: US 8,011,740 B2
(45) Date of Patent: Sep. 6, 2011

(54) IDLER RECOIL ASSEMBLY AND MACHINE USING SAME

(75) Inventor: Hector M. Matthys, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 124 days.

(21) Appl. No.: 12/069,541

(22) Filed: Feb. 11, 2008

(65) Prior Publication Data

US 2009/0200862 A1 Aug. 13, 2009

(51) Int. Cl.
*B62D 55/30* (2006.01)
*B62D 55/32* (2006.01)

(52) U.S. Cl. .................... 305/148; 305/143; 305/145

(58) Field of Classification Search .................. 305/143, 305/144, 145, 146, 147, 148, 152, 153, 155, 305/124, 125, 151
See application file for complete search history.

(56) References Cited

U.S. PATENT DOCUMENTS

| | | | |
|---|---|---|---|
| 2,054,533 A * | 9/1936 | Baker et al. .................... 474/138 |
| 2,604,338 A * | 7/1952 | Kelly et al. ...................... 285/29 |
| 3,645,586 A * | 2/1972 | Piepho .......................... 305/146 |
| 3,829,172 A * | 8/1974 | Oestmann et al. ............ 305/147 |
| 3,899,218 A * | 8/1975 | Blomstrom et al. .............. 305/9 |
| 3,912,335 A | 10/1975 | Fisher |
| 3,938,851 A * | 2/1976 | Shelby et al. .................. 305/147 |
| 3,980,351 A | 9/1976 | Orr et al. |
| 4,149,757 A * | 4/1979 | Meisel, Jr. ..................... 305/146 |
| 4,324,303 A * | 4/1982 | Balzer et al. ................... 180/9.5 |
| 4,545,624 A * | 10/1985 | Van Ooyen ....................... 305/9 |
| 4,854,650 A | 8/1989 | Getz et al. |
| 5,794,731 A | 8/1998 | Klaus |
| 6,682,155 B2 | 1/2004 | Hoff et al. |
| 7,252,349 B2 | 8/2007 | Livesay et al. |
| 2003/0117017 A1 | 6/2003 | Hoff |

FOREIGN PATENT DOCUMENTS

DE 3404517 A1 8/1985
JP 4-133883 5/1992

* cited by examiner

*Primary Examiner* — Kip Kotter
(74) *Attorney, Agent, or Firm* — Liell & McNeil

(57) ABSTRACT

A track type tractor includes a modular track roller frame made up of easily assembled sub-components. Among these sub-components are an idler recoil assembly that may slide into, and then fastened to a housing as a unit to create a track roller frame assembly. The idler recoil assembly includes a gas spring telescoping section and a length adjustment telescoping section located between a housing contact end and a yoke contact end. Although suspended above a floor of the housing, the idler recoil assembly may only be attached to the housing in a plane via an array of fasteners that surround a shaft axis. The housing encloses the idler recoil assembly against debris entry, but includes an access cover for servicing the gas spring and/or adjusting track tension via the length adjustment feature.

4 Claims, 4 Drawing Sheets

IDLER RECOIL ASSEMBLY AND MACHINE USING SAME

TECHNICAL FIELD

The present disclosure relates generally to idler recoil systems for machines, and more particularly to a track frame roller assembly that includes an idler recoil assembly enclosed in a housing.

BACKGROUND

Track type tractors are one type of machine that utilize an idler recoil system in order to better allow the tracks of the machine to interact with variable loads encountered when the machine is being maneuvered over the ground. A typical track system may include a forward idler that is supported by a track roller frame assembly about which the track is mounted. The idler may typically be supported by a yoke that may slide fore and aft within the track roller frame assembly in order to react to various loads that are transmitted from the track to the idler. The yoke in turn acts upon a spring that is compressed when the idler and yoke are pushed into the track roller frame assembly. The spring then pushes back on the yoke and idler to recoil both toward their undisturbed operating configuration.

In the past, recoil springs were usually made up of heavy mechanical springs. More recently, such as shown in co-owned U.S. Pat. No. 7,252,349, gas springs have been gaining wider acceptance and usage. Gas springs have the advantage over conventional mechanical springs in that their pre-load can be adjusted by adding or removing gas, such as nitrogen, to and from the gas spring. The '349 patent is also of interest for teaching the inclusion of a track tensioning feature located between the yoke and the gas spring of the recoil system. In particular, a grease volume may be filled with a selected volume of grease to adjust the effective distance between the gas spring and the yoke, thereby adjusting a forward position of the idler an consequently the tension in the track that is mounted about the track roller frame assembly.

Although a variety of track roller frame assemblies and their associated recoil systems have performed well over many years, there remains room for improvement, particularly in the areas of assembly, packaging and servicing. For instance, the '349 patent teaches a recoil and adjustment system for a track type tractor in which the various components of the recoil system are individually attached within the track roller frame housing. This construction can make assembly more cumbersome and give rise to possible misalignment compensation strategies associated with a line of force from the idler, through the yoke, through the tensioning adjustment system and finally to the recoil gas spring.

The present disclosure is directed toward one or more of the problems associated with recoil systems for the machines including but not limited to assembly, packaging and servicing.

SUMMARY OF THE DISCLOSURE

In one aspect, an idler recoil assembly includes a bulkhead mounted about a reciprocable shaft. The bulkhead is slidable along a range of positions along a shaft axis of the reciprocable shaft. The reciprocable shaft includes a gas spring telescoping section and a length adjustment telescoping section with a grease volume positioned between a yoke contact end and a housing contact end.

In another aspect, a machine has a track roller frame assembly that includes an idler recoil assembly enclosed in a housing. The idler recoil assembly includes a reciprocable shaft suspended above a floor of the housing by being supported adjacent opposite ends in the housing. The reciprocable shaft includes a gas spring telescoping section and a length adjustment telescoping section with a grease volume positioned between a yoke contact end and a housing contact end.

In still another aspect, a method of preparing a recoil system for operation includes sliding an idler recoil assembly into a housing until a housing contact end of a reciprocable shaft of the idler recoil assembly is received in a complementary counter bore defined by the housing. The idler recoil assembly is attached to the housing with an array of fasteners in a plane where a bulkhead of the idler recoil assembly contacts the housing.

DETAILED DESCRIPTION

Figure 1:
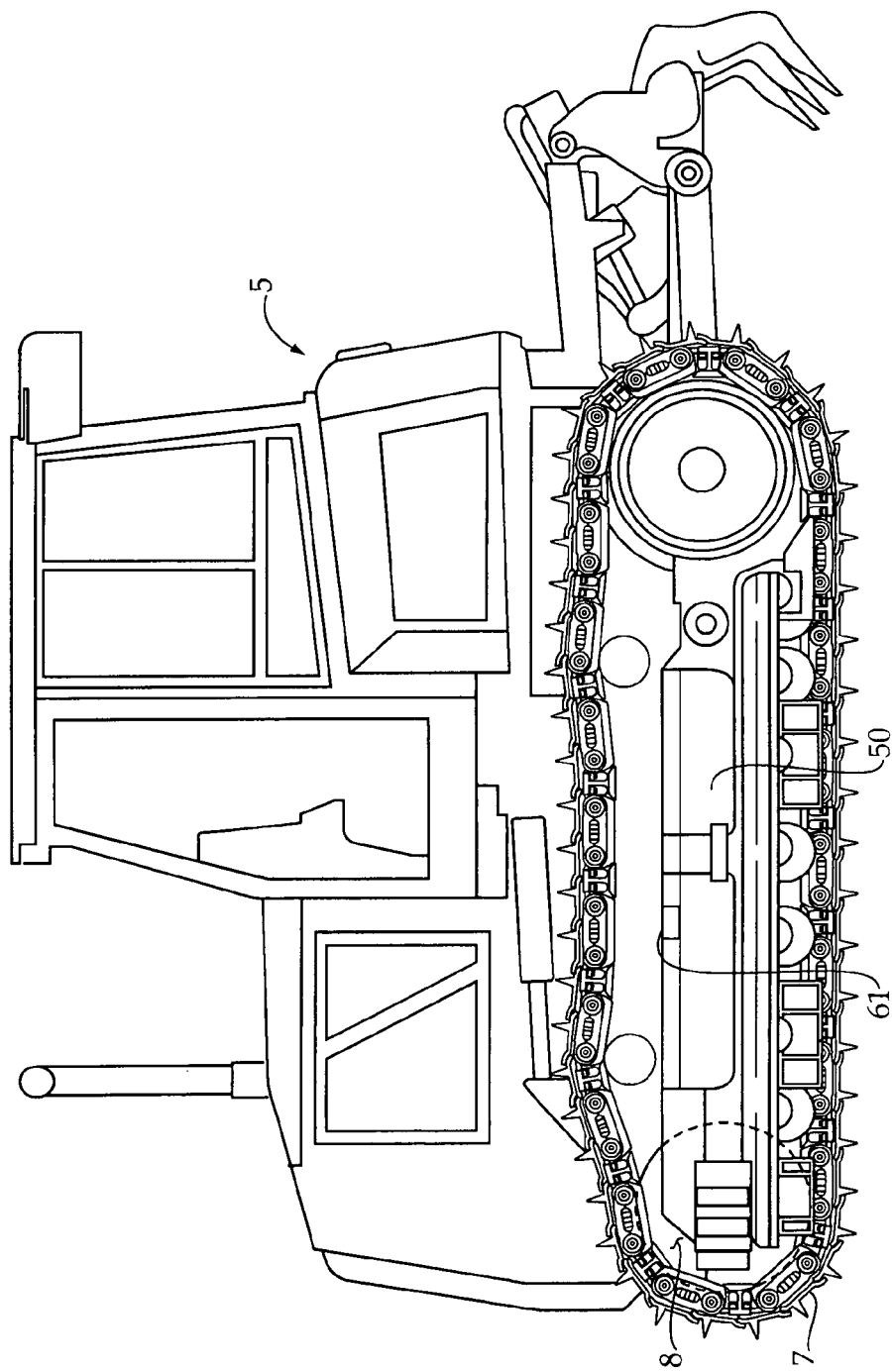
FIG. 1 is a perspective view of a machine according to one aspect of the present disclosure.

Referring to FIGS. 1-4, a machine 5 according to the present disclosure may be a track type tractor 5 or some other machine that includes a track 7 mounted around a track roller frame assembly 50. For instance, a variety of track type machines, including but not limited to excavators, loaders and landfill equipment, as well as others, are within the scope of the present disclosure. In addition, these types of machines are themselves typically made up of smaller machines. For instance, track type tractor 5 may be considered a machine according to the present disclosure, but the track roller frame assembly may also be considered a machine according to the present disclosure. In any event, track 7 typically is supported on one end by an idler that itself is supported on a yoke 90 that in turn is slidably supported in the track roller frame assembly 50, typically between wear plates that may be serviced at regular intervals. Those skilled in the art will appreciate that, during normal operation of machine 5, a variety of forces will act on track 7, and in turn on idler 8, causing the idler to move toward the track roller frame assembly 50. An idler recoil assembly 10 is located within the housing 60 of track roller frame assembly 50 and provides the means by which these forces are absorbed and also provides a means by which a tension in the track 7 may be adjusted via an access cover 61. Those skilled in the art will appreciate that during normal operation, wear on the track 7 and the associated rollers and idler 8 will typically cause a decrease track tension over time. This wear can be compensated for by adjusting a length of the reciprocable shaft 11 of the idler recoil system 10 as described infra.

Figure 2:
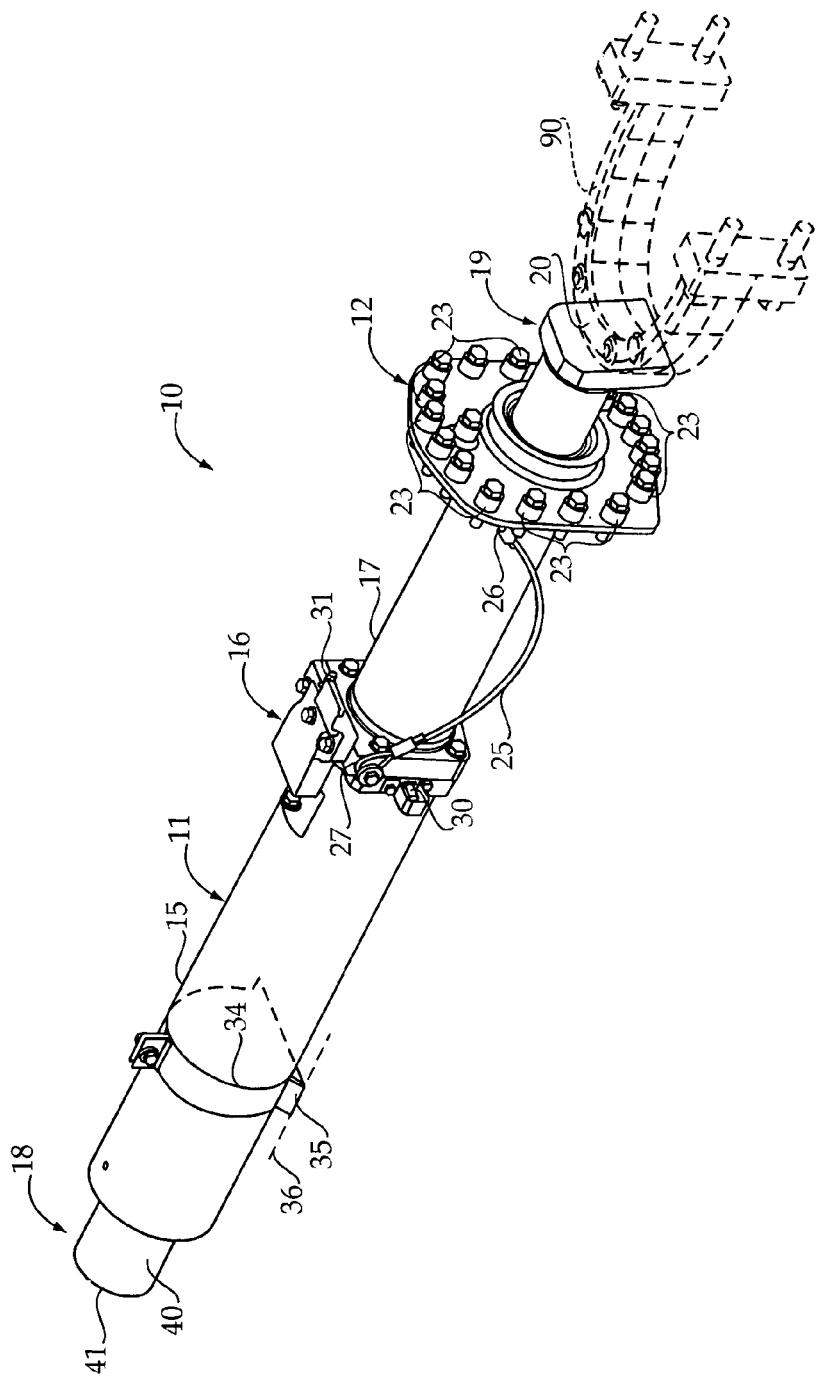
FIG. 2 is a perspective view of an idler recoil assembly for the machine of FIG. 1.
Figure 3:
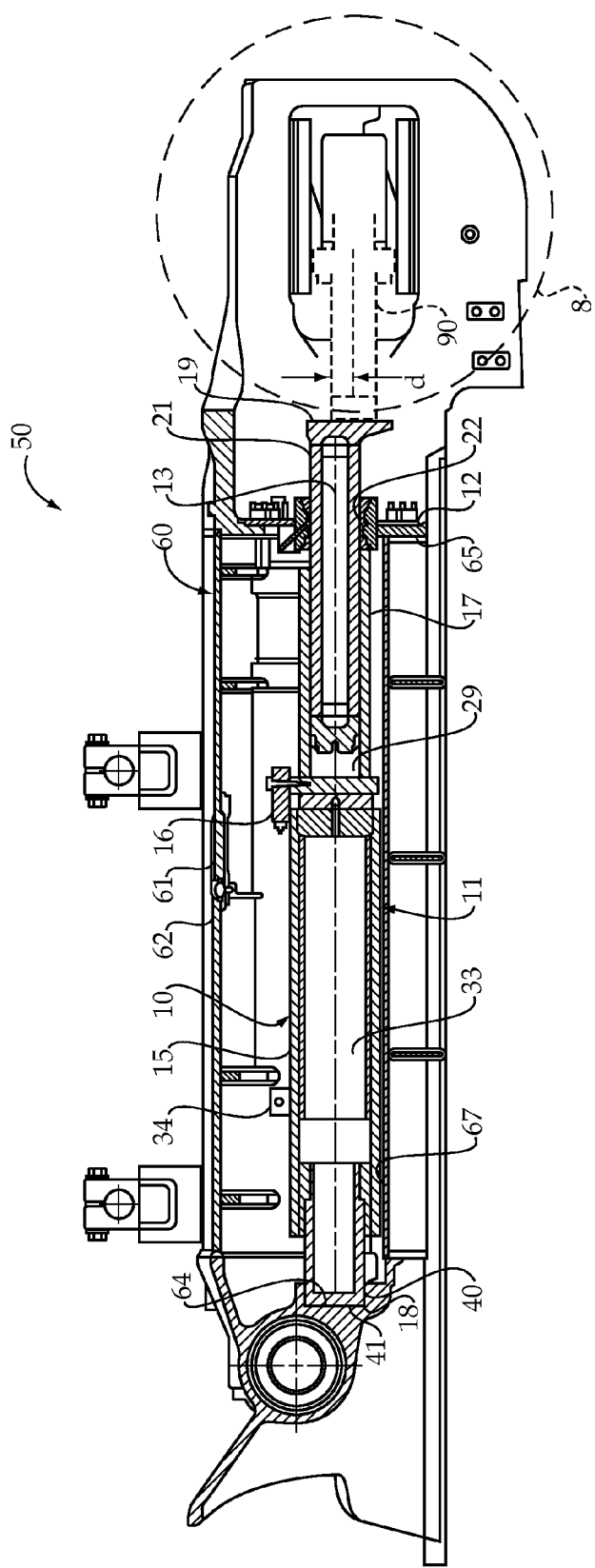
FIG. 3 is a sectioned side view of a track frame roller assembly for the machine of FIG. 1 that includes the idler recoil assembly of FIG. 2.
Figure 4:
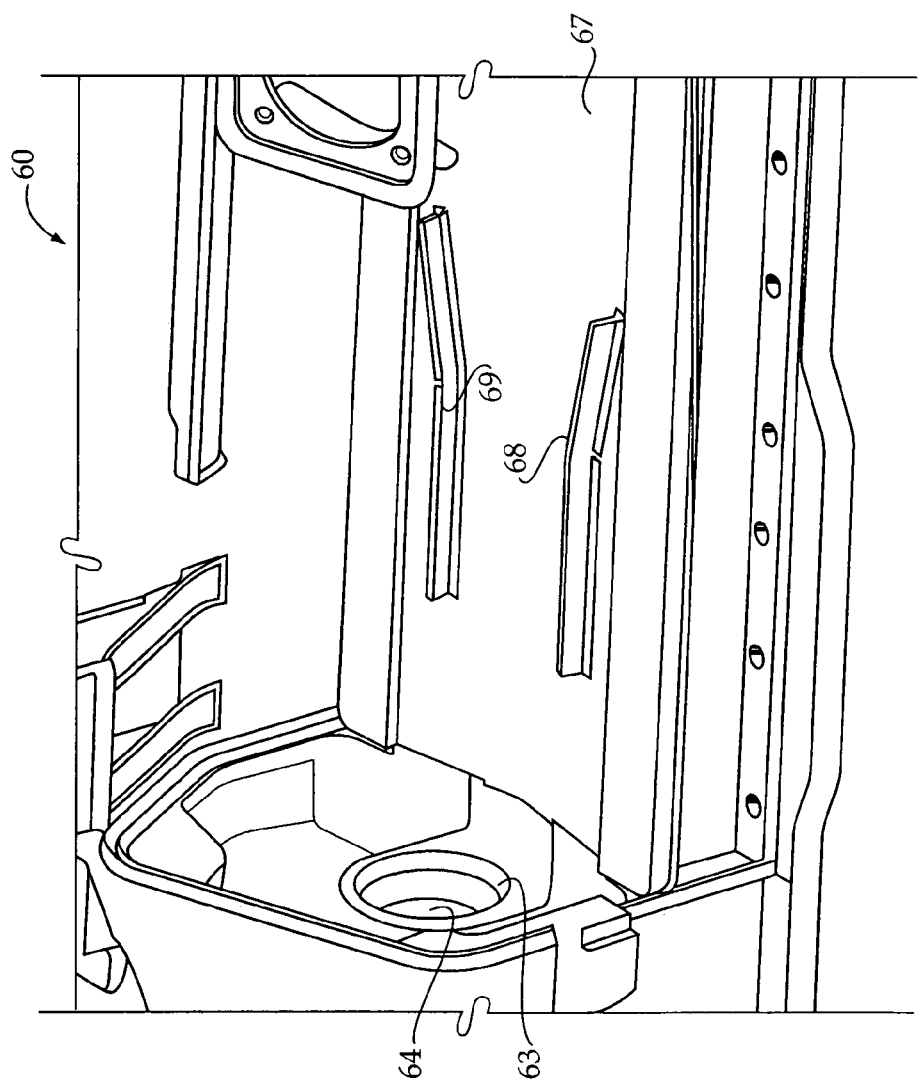
FIG. 4 is a perspective internal view of a back portion of the housing from FIG. 3.

In order to ease assembly, idler recoil assembly 10 may be a complete subassembly as shown in FIG. 2. In particular, idler recoil assembly 10 includes a reciprocable shaft 11 about which is mounted a slidable bulkhead 12, which may be slidable along a range of positions along a shaft axis 13 of reciprocable shaft 11. This distance may generally be on the order of a maximum deflection of shaft 11. Reciprocable shaft 11 includes a gas spring telescoping section 15 attached to a length adjustment telescoping section 17 via an attachment interface section 16. Telescoping sections 15 and 17 are located between a housing contact end 18 and a yoke contact end 19. A yoke 90 is shown in shadow in the position it would be abutting a contact surface 20 of yoke contact end of reciprocable shaft 11 both in FIGS. 2 and 3 to aid in clarity. In particular, the yoke 90 may make contact surface 20 offset a distance d from shaft axis 13 in a downward direction as best shown in FIG. 3. Yoke contact end 19 is located on one end of a piston 21 that forms a portion of the length adjustment telescoping section 17. The length adjusting feature includes a grease volume 29 defined in part by one end of piston 21. The length of reciprocable shaft 11 may be adjusted by adding or removing grease from grease volume 29 via a grease port 31 that is attached to the reciprocable shaft 11 at interface attachment section 16 as best shown in FIG. 2.

The yoke contact end 19 of reciprocable shaft 11 is supported in housing 60 by attaching bulkhead 12 to a counterpart bulkhead 65 of housing 60 via an array of fastener bores 23 that surround shaft axis 13. Thus, bulkhead 12 can be considered to have a shape for attachment to a track roller frame. This attachment strategy also closes off one potential debris access pathway into the recoil interior of housing 60. Although bulkhead 12 is thus fixed with regard to housing 60, piston 21 of shaft 11 can slide within bulkhead 12 via a sliding interface 22. In order to better facilitate a potential removal of idler recoil assembly 10 from housing 60 for servicing overhauls and the like, the bulkhead 12 may be tethered to the reciprocable shaft via a cable 25 that is attached at opposite ends 26 and 27 to the bulkhead 12 and reciprocable shaft 11, respectively. Gas spring telescoping section 15 may be of a conventional design that includes a variable pressure gas volume 33 that is fluidly connected to a gas port 30 attached to the reciprocable shaft 11 at interface attachment section 16.

In order to assist in installation of idler recoil assembly 10 into housing 60, a guide 34 may be attached at a suitable location on reciprocable shaft 11, such as about gas spring telescoping section 15 as shown in FIG. 2. Guide 34 includes a guide interaction surface, in form of feet that interact with lateral guide segments 68 and 69 (FIG. 4) when idler recoil assembly 10 is slid into housing 60 to arrive at the configuration shown in FIG. 3. The guide interaction surfaces 35 include an orientation 36 that is parallel to shaft axis 13 so as to interact with lateral guides 68 and 69 and guide housing contact end 18 toward engagement with counter bore 64. In addition, the height of guide interaction surfaces 35 may be such that as the guide 34 is supported on floor 67 of housing 60, a keyed end 40 of housing contact end 18 may contact a bevel 63 that forms the transition to counter bore 64. In particular, housing contact end 18 includes a keyed surface 40, which is illustrated as cylindrical, that is parallel to shaft axis 13 and is shaped to be received and held in place against movement perpendicular to shaft axis 13 via an interaction with complementary counter bore 64 of housing 60. In the illustrated embodiment, when keyed surface 40 is pushed along bevel 63 into counter bore 64, guide 34 may be lifted slightly out of contact with floor 67 of housing 60 when thrust surface 41 contacts the back surface of counter bore 64. As best shown in FIG. 3, thrust surface 41 may be oriented perpendicular to shaft axis 13.

Although not necessary, housing 60 may include a one piece frame 62 made up of a variety of plates and/or machined components welded to one another to enclose the length of reciprocable shaft 11 except for the inclusion of an opening adjacent yoke 90 and an access opening that may be closed with a cover 61 as shown in FIG. 3. In particular, housing 62 may be closed to prevent debris from entering into the hollow space within housing 60 in order to prevent debris such as mud, gravel and the like from interfering with the operation and the working life of the idler recoil assembly 10. Although this enclosure may not be completely fluid tight, there may be the inclusion of one or more drains ports located along the length of frame 62 to drain liquid from within housing 60. Although such drain ports are not shown, they may be of a conventional design and may be opened and closed via a conventional bolt plugging strategy of a type known in the art. The attachment of bulk head 12 to bulk head 65 substantially closes the otherwise open end of housing 60 that is in the vicinity of yoke 90. The access cover 61 may be normally closed, but may be opened for servicing and the like in order to access the grease port 31 and/or gas port 30. Thus, unlike some prior designs, external debris has little to no access opportunity into the vicinity around idler recoil assembly 10.

INDUSTRIAL APPLICABILITY

The idler recoil assembly of the present disclosure finds potential application in any machine that includes an idler that supports a track that undergoes forces necessitating a recoil system. The present disclosure finds specific applicability to track roller frame assemblies associated with tracked type tractors and other track machines known in the art. The packaging and assembly strategies exemplified by the present disclosure find applicability to easing manufacturing complexities associated with constructing tracked machines of the type typified in FIG. 1. In other words, the structure taught in the present disclosure permits an idler recoil assembly to be pre-assembled and joined as a unit to the housing of a track roller frame assembly, rather than having the idler recoil system assembled inside piece by piece in the track roller frame assembly, as in the prior art.

When assembling machines 5 of the type shown in FIG. 1, an assembly line may be equipped with already preassembled idler recoil assemblies as shown in FIG. 2. Each idler recoil assembly 10 may be joined to an associated housing 60 by inserting the housing contact end 18 of the reciprocable shaft into the yoke end of housing 60 until the guide 34 can be rested onto floor 67. Thereafter, the idler recoil assembly 10 may be slid in a direction corresponding to shaft axis 13 until guide interaction surfaces 35 are laterally centered via an interaction with lateral guides 68 and 69. Thereafter, the advancement of the idler recoil assembly 10 is continued until the keyed surface 40 contacts the bevel 63 of counter bore 64. A further push causes the keyed surface 40 to ride up the beveled 63 and be received into counter bore 64 until thrust surface 61 contacts housing 60. When this is done, the guide 34 is lifted slightly out of contact with floor 67 so that reciprocable shaft is suspended above floor 67. When this occurs, the bulk head 12 should come in close proximity and/or contact with bulk head 65 at a contact plane. The idler recoil assembly 10 may then be attached to housing 60 via the array of fasteners 23 surrounding shaft axis 13. This renders the reciprocable shaft supported adjacent its opposite ends 18 and 19 within housing 60 above floor 67. The idler recoil system of the present disclosure may then be further prepared for operation by opening access cover 61 and checking the pressure in gas spring telescoping section 15 via gas port 30. In addition, the tension in track 7 may be adjusted by also accessing a grease port 31 via the access opening covered by cover 61. Tensioning may be accomplished by adding or removing grease from grease volume 29 to adjust the overall length of reciprocable shaft 11 and hence the tension in track 7.

The track roller frame assembly 50 of the present disclosure has the advantage of having a major component, mainly the idler recoil assembly, pre-assembled before being mated to the housing 60. This packaging strategy has the advantage of avoiding some potential misalignment possibilities associated with recoil systems, and also hastens the assembly procedure by the inclusion of the various interactive guide surfaces discussed above. In addition, these features in turn allow for the construction of a one piece frame 62 that may include only two openings, one of which may be closed via the attachment of bulk head 12 and the other via access cover 61. This may substantially prevent debris from entering into the enclosed chamber where it might accumulate and potentially undermine the operation and/or working life of idler recoil assembly 10.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A method of preparing a recoil system for operation, comprising the steps of:

sliding an idler recoil assembly into a housing until a housing contact end of a reciprocable shaft of the idler recoil assembly is received in a complementary counter bore defined by the housing;

attaching the idler recoil assembly to the housing with an array of fasteners in a plane where a bulkhead of the idler recoil assembly contacts the housing;

wherein the sliding step includes guiding the end of the shaft toward the counter bore by an interaction of lateral guide segments of the housing with guide interaction surfaces of the idler recoil assembly;

wherein the guiding step includes supporting a guide, which includes the guide interaction surfaces, of the idler recoil assembly on a floor of the housing during a portion of the sliding step; and lifting the guide of the idler recoil assembly out of contact with the floor when the housing contact end is received in the complementary counter bore of the housing.

2. The method of claim 1 including a step of sealing the housing against debris entry along a length of the reciprocable shaft.

3. The method of claim 2 including a step of increasing a length of the reciprocable shaft by injecting grease into a grease volume of the idler recoil assembly; and adjusting a preload of a gas spring by exchanging gas with a gas volume of the idler recoil assembly.

4. The method of claim 3 wherein the increasing and adjusting steps are accomplished by opening an access cover attached to a frame of the housing.

* * * * *